US008561090B2

(12) United States Patent
Schneider

(10) Patent No.: US 8,561,090 B2
(45) Date of Patent: Oct. 15, 2013

(54) METHOD AND AN APPARATUS TO IMPLEMENT SECURE SYSTEM CALL WRAPPERS

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 917 days.

(21) Appl. No.: 12/393,997

(22) Filed: Feb. 26, 2009

(65) Prior Publication Data
US 2010/0218201 A1    Aug. 26, 2010

(51) Int. Cl.
*G06F 3/00* (2006.01)
(52) U.S. Cl.
USPC .............................. 719/330; 726/26; 726/27
(58) Field of Classification Search
None
See application file for complete search history.

(56) References Cited

U.S. PATENT DOCUMENTS

| | | | | |
|---|---|---|---|---|
| 6,658,571 | B1* | 12/2003 | O'Brien et al. | 726/26 |
| 7,219,354 | B1* | 5/2007 | Huang et al. | 719/328 |
| 7,971,255 | B1* | 6/2011 | Kc et al. | 726/24 |
| 2005/0257243 | A1* | 11/2005 | Baker | 726/1 |
| 2006/0075464 | A1* | 4/2006 | Golan et al. | 726/1 |
| 2007/0199045 | A1* | 8/2007 | Kime et al. | 726/2 |

OTHER PUBLICATIONS

Terrence Mitchem, Raymond Lu, Richard O'Brien; Using kernel hypervisors to secure applications; Computer Security Applications Conference, 1997. Proceedings., 13th Annual; Aug. 12, 1997; pp. 175-181.*
Timothy Fraser, Lee Badger, Mark Feldman; Hardening COTS software with generic software wrappers; Security and Privacy, 1999. Proceedings of the 1999 IEEE Symposium; Issue date 1999; pp. 2-16.*
Watson, R.N.M., "Exploiting Concurrency Vulnerabilities in System Call Wrappers", WOOT '07 First USENIX Workshop on Offensive Technologies, Aug. 6-10, 2007, Boston, 8 pages.
Wikipedia, "System Call", last modified: Jan. 19, 2009, accessed at: http://en.wikipedia.org/wiki/System_call, accessed on: Jan. 28, 2009, 3 pages.
Wikipedia, "Kernel (computing)", last modified: Jan. 26, 2009, accessed at: http://en.wikipedia.org/wiki/Kernel_(computer_science), accessed on: Jan. 28, 2009, 18 pages.

* cited by examiner

*Primary Examiner* — Emerson Puente
*Assistant Examiner* — Dong Kim
(74) *Attorney, Agent, or Firm* — Lowenstein Sandler LLP

(57) ABSTRACT

Some embodiments of a method and an apparatus to a method and an apparatus to implement secure system call wrapper have been presented. In one embodiment, a system call wrapper is used to validate parameters of a system call directed to a kernel from a user-space process. The user-space process supplies the parameters of the system call. The parameters are protected from being accessed by processes in the user-space after the parameters have been validated.

21 Claims, 4 Drawing Sheets

METHOD AND AN APPARATUS TO IMPLEMENT SECURE SYSTEM CALL WRAPPERS

TECHNICAL FIELD

Embodiments of the present invention relate to computing environment, and more specifically to securing system calls made to a kernel in the computing environment.

BACKGROUND

Conventionally, system call wrappers are used frequently in a computing environment to protect security of the computing environment. However, many of these conventional system call wrappers cannot be secure without implementing extensive changes in the underlying operating system. As a result, a significant amount of overhead is incurred.

Furthermore, some conventional system call wrappers are themselves targets for security exploits. The basis for the paradoxical security holes caused by system call wrappers is the violation of assumptions concerning the atomicity of various operations. In the ordinary course of events, user-supplied parameters to system calls are checked by the kernel at the same time that they are going to be used. For example, if a process attempts to open a file for write operations, the kernel may validate the filename against the process capabilities at the same time the kernel reads the file name from the user process address space.

The problem occurs when this implicit contract (simultaneous access and validation) is violated by the appearance of a system call wrapper. Without substantial changes to the operating system, the system call wrapper is forced to leave the user-supplied parameters in the address space of the calling process. So, a process that is capable to change the parameters between the time that the parameters are checked by the system call wrapper and the time that the parameters are used by the kernel can circumvent the protection that was supposed to be supplied by the system call wrapper.

This can be a devastating problem as one typical usage of the system call wrappers is to implement virtual server compartments, where the administrator of any particular compartment is not supposed to have any access (much less administrative access) to anything outside of the compartment. An attacker with legitimate administrative access to one of these compartments (for example, a customer of a web hosting service) may exploit this vulnerability to completely subvert the host system.

BRIEF DESCRIPTION OF THE DRAWINGS

The present invention is illustrated by way of example, and not by way of limitation, in the figures of the accompanying drawings and in which.

DETAILED DESCRIPTION

Figure 1:
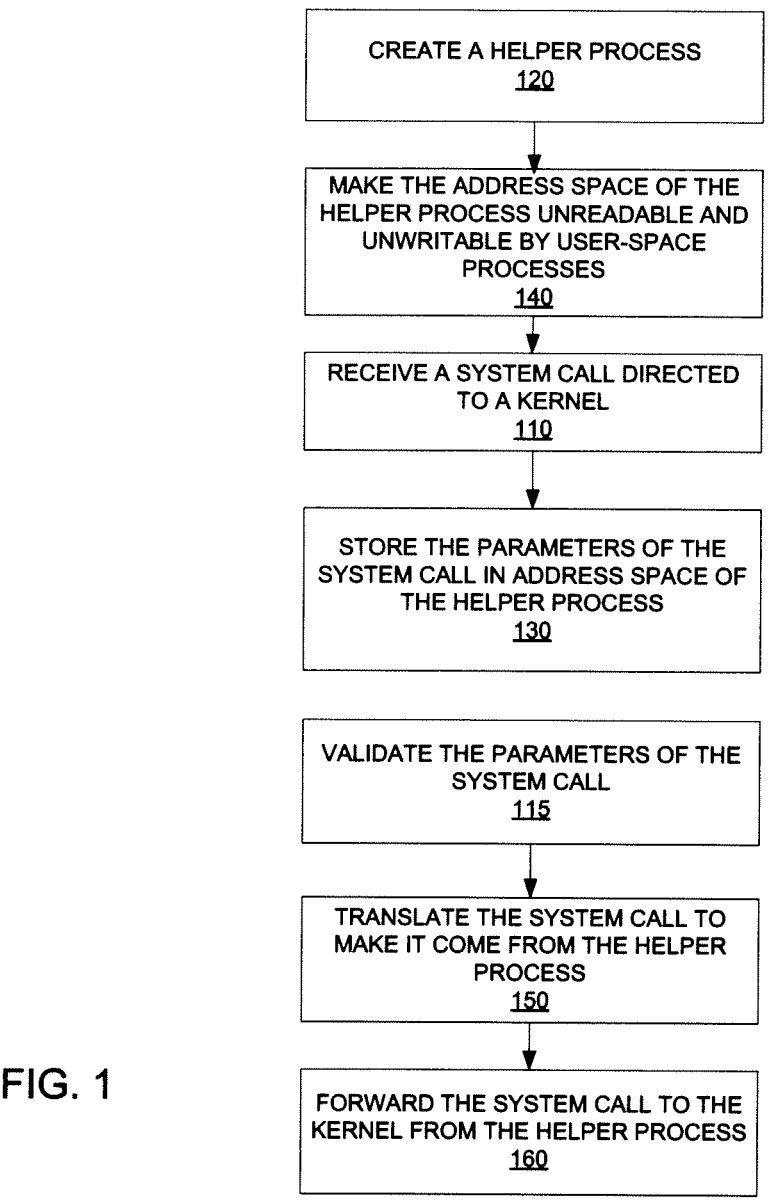
FIG. 1 illustrates a flow diagram of one embodiment of a method to secure system call wrapper.

Described herein are some embodiments of a method and an apparatus to implement secure system call wrapper. In one embodiment, a system call wrapper is used to validate parameters of a system call directed to a kernel from a user-space process. The user-space process supplies the parameters of the system call. The parameters are protected from being accessed by processes in the user-space after the parameters have been validated. More details of some embodiments of the method and apparatus to implement secure system call wrapper are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a flow diagram of one embodiment of a method to secure system call wrapper. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the protection mechanism 225 illustrated in FIG. 2 in some embodiments.

Initially, processing logic creates a helper process separate from the user-space process (processing block 120). A process as used herein broadly refers to a discretely executable component in the computer, which is independently schedulable, loadable, and executable. For instance, a process may include an executable of a user application. A helper process is a process that helps the kernel to perform its tasks, but unlike other processes, the helper process itself is never scheduled to run. Nevertheless, the helper process may have its own address space. Processing logic then makes the address space of the helper process unreadable and unwritable by all processes in the user-space (processing block 140). In other words, no process in the user-space can read from or write to the address space of the helper process. In some embodiments, an exception may be provided to those user-space processes that explicitly share the address space with the helper process. Thus, no user-space process may modify the parameters once the parameters have been validated by the system call wrapper and stored in the address space of the helper process.

In some embodiments, processing logic receives a system call directed to a kernel from a user-space process (processing block 110). A kernel as used herein broadly refers to a module in an operating system of a computer, which manages the resources of the computer, including, but not limited to, memory management, process and task management, and device management. A system call as used herein broadly refers to a request from a user-space process to the kernel for performing a specific task. The specific task may be chosen from a set of predefined tasks. In some embodiments, the system call includes one or more parameters supplied by the user-space process. For instance, the user-space process may attempt to open a document, and the system call includes a file name of the document. Other examples of the parameters include memory address locations, device identifiers, network addresses, shared memory structures, mutual exclusion structures, processes, threads, etc. In response to the system call, processing logic stores the parameters of the system call in the address space of the helper process (processing block 130). Processing logic then validates the parameters of the system call using a system call wrapper (processing block 115). By validating the parameters before the system call is forwarded to the kernel, the system call wrapper protects the kernel from potential malicious attack.

In some embodiments, processing logic translates the system call to make the system call come from the helper process (processing block 150). Finally, processing logic forwards the system call to the kernel from the helper process (processing block 160). By storing the parameters of the system call in the address space of the helper process before the parameters have been validated, processing logic prevents processes in the user-space from modifying the parameters after validation of the parameters. Attackers cannot circumvent the protection of the kernel provided by the system call wrapper by exploiting the security loophole discussed above. Furthermore, the above approach closes the potential security gap of the system call wrapper without making significant changes to the operating system. Thus, the above approach can be readily and cost-effectively implemented in many computing systems.

Figure 2:
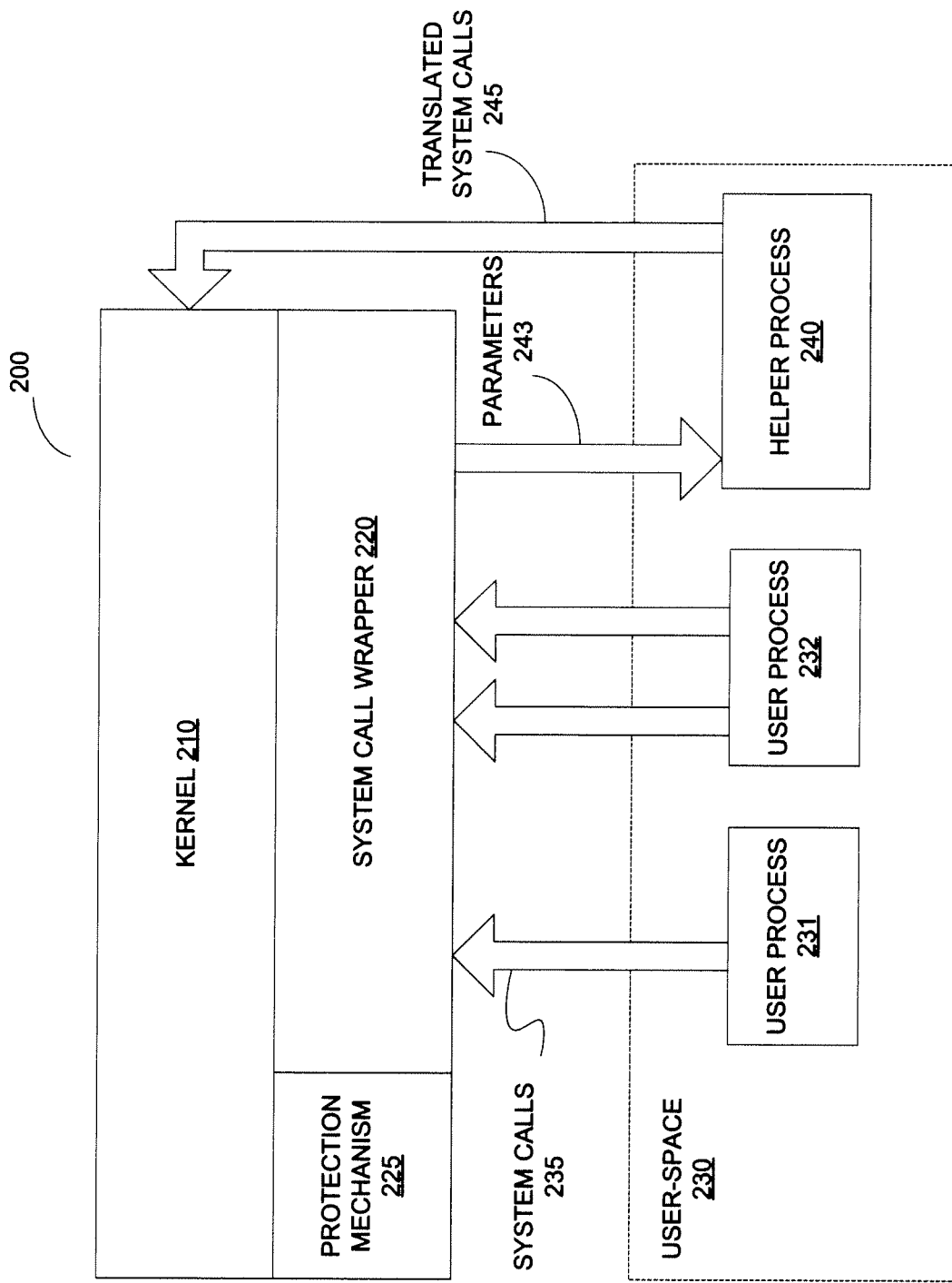
FIG. 2 illustrates a one embodiment of a computing environment.

FIG. 2 illustrates one embodiment of a computing environment. The computing environment 200 may be implemented using a computer system (e.g., a server, a personal computer, a personal digital assistant, etc.). One exemplary computer system usable to implement the computing environment 200 is shown in details in FIG. 4.

In some embodiments, the computing environment 200 includes a kernel 210, a system call wrapper 220, a protection mechanism 225, and user-space 230. The system call wrapper 220 and the protection mechanism 225 are coupled to each other, and in between the kernel 210 and the user space 230. As shown in FIG. 2, the system call wrapper 220 and the protection mechanism 225 are components separate from the kernel 210. However, in some alternate embodiments, the system call wrapper 220 and the protection mechanism 225 are part of the kernel 210. In the user-space, there are user processes run by user applications, such as user processes 231 and 232.

Note that any or all of the components of the computing environment 200 and associated hardware may be used in various embodiments of the present invention. However, it can be appreciated that other configurations of the computing environment 200 may include more or fewer components than those discussed above. The kernel 210, the system call wrapper 220, etc., are illustrative examples of components in the computing environment 200. One should appreciate that other types of components and/or devices may be included in the computing environment 200 in other embodiments. For example, the kernel 210 may be further coupled to a central processing unit (CPU), a memory, input/output devices, etc., in the computing environment.

To protect the kernel from unauthorized user manipulation, all system calls made to the kernel 210 from the user-space 230 have to go through the system call wrapper 220, which validates the parameters of the system calls. However, as discussed above, one potential compromise of security occurs when the parameters are left in the user-space 230 after the parameters have been validated by the system call wrapper 220. To close this security loophole, the protection mechanism 225 of the system call wrapper 220 creates a helper process 240 in the user-space 230, which is substantially completely controlled by the system call wrapper 220. Moreover, the protection mechanism 225 makes the address space of the helper process 240 unreadable and unwritable by other processes (e.g., user processes 231 and 232) in the user-space 230. In one embodiment, an exception may be made for processes in the user-space 230 that explicitly share the address space with the helper process 240. More details of one embodiment of the protection mechanism 225 are discussed below with reference to FIG. 3. In some embodiments, the system call wrapper 220 stores all parameters 243 of the system calls into the address space of the helper process 240 before validating the parameters 243. Because other user processes cannot read from or write to the address space of the helper process 240, the other user processes cannot change or modify the parameters 243 in the address space of the helper process 240 after they have been validated. After validating the parameters 243, the system call wrapper 220 translates the system calls into system calls 245 coming from the helper process 240.

In some embodiments, the helper process 240 is essentially a pseudo process solely controlled by the system call wrapper 220. The helper process 240 is a process object that is not scheduled to run. The helper process 240 simply provides a secure address space. In some embodiments, the helper process 240 is owned by an administrative user, such as "root" in a UNIX or Linux system, or "LOCAL SYSTEM" in a Windows system.

In some alternate embodiments, the protection mechanism 225 instantiates a separate helper process object for each user-space process running in the computing environment 200. Each helper process object is assigned an identification associated with its corresponding user-space process. For instance, in one embodiment, an odd process identification (ID) number is assigned to each user-space process, and an even process ID number immediately following the odd process ID number is assigned to the corresponding helper process object. For example, the process ID of a user-space process may be 15, and the process ID of its corresponding helper process object would be 16. Because the relationship between the user-space process and the helper process object is implicit in their process identifications, translation of the system call from the user-space process is not needed. Unlike the helper process 240 discussed above, the helper process object may be owned by the appropriate user account, instead of the administrative user. However, the system call wrapper 220 remains the only component capable of manipulating the separate helper process object in order to secure the system call wrapper 220.

Figure 3:
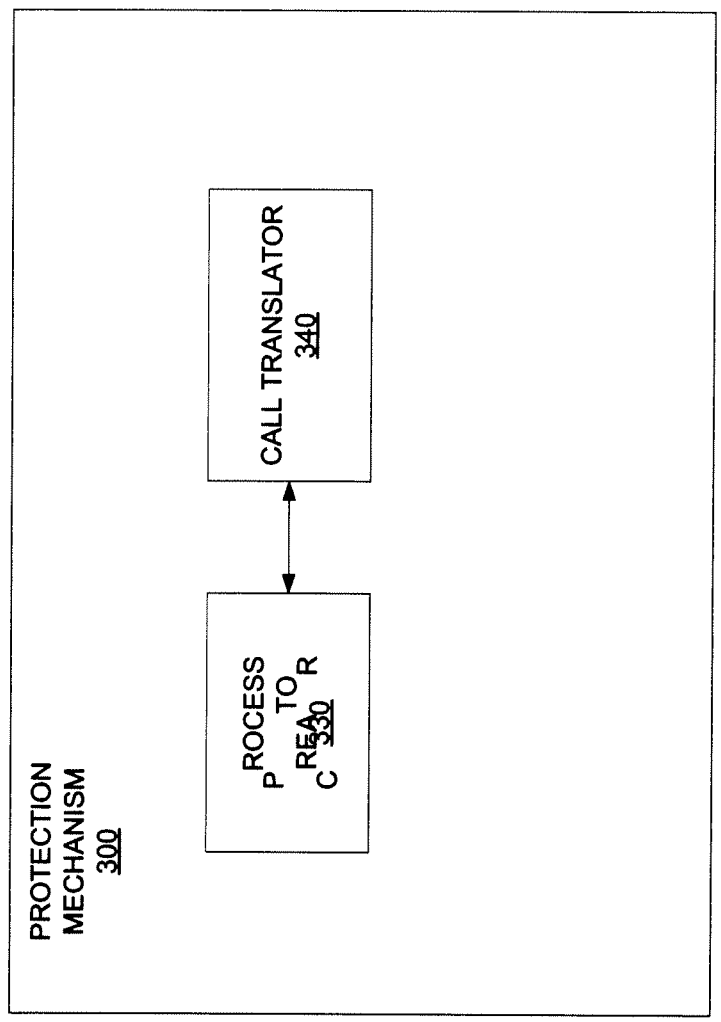
FIG. 3 illustrates one embodiment of a protection mechanism of a system call wrapper.

FIG. 3 illustrates one embodiment of a protection mechanism usable by a system call wrapper in a computing environment. The protection mechanism 300 may or may not be implemented as part of the system call wrapper. The protection mechanism 300 includes a process creator 330 and a call translator 340.

In some embodiments, the process creator 310 creates a helper process separate from user-space of the computing environment. The system call wrapper (such as the system call wrapper 220 in FIG. 2) has sole control over the helper process. The process creator 330 may define address space for the helper process, which is made unreadable and unwritable by user processes. In response to a system call directed to a kernel of the computing environment, the protection mechanism 300 stores parameters of the system call before the parameters are validated by the system call wrapper. Because the address space of the helper process unreadable and unwritable by processes in the user-space, the parameters written in the address space are protected from unauthorized or malicious manipulation by the user-space processes. Then the call translator 340 translates the system calls into system calls from the helper process. From the helper process, the translated system calls are then forwarded to the kernel.

Alternatively, the process creator 330 may create a separate helper process object for each process in the user-space, and may grant ownership of the separate helper process object to a respective user account. However, the process creator 330 nevertheless sets up the helper process object to be controlled by only the system call wrapper in order to prevent processes in the user-space to alter the parameters of system calls validated.

Figure 4:
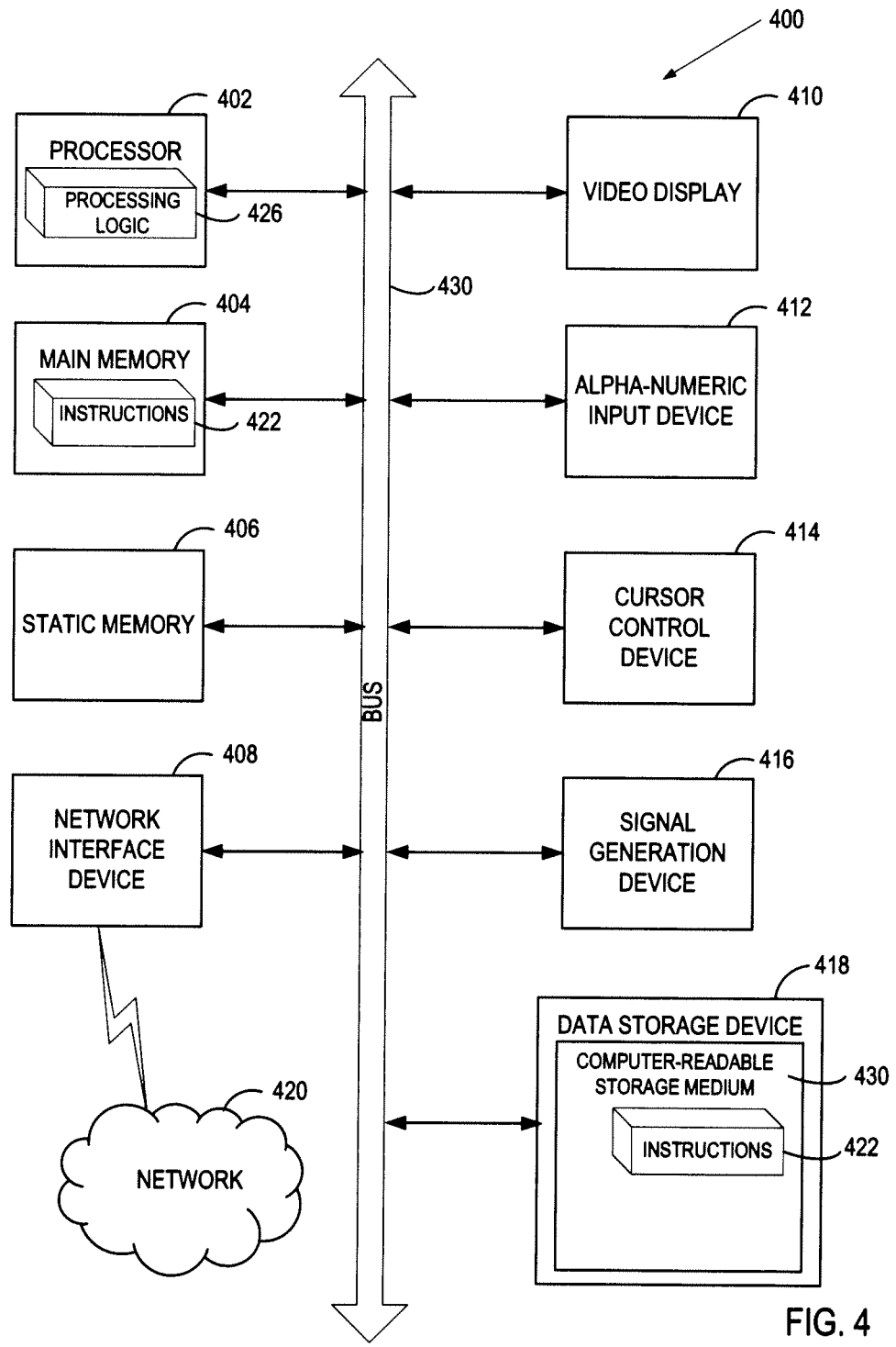
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting computer-accessible storage media. The software 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of a method and an apparatus to a method and an apparatus to implement secure system call wrapper have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    validating, by a system call wrapper in a computer system, a plurality of parameters of a system call directed to a kernel, the plurality of parameters supplied by a user process in a user-space in a user-space memory located outside of a kernel space of the computer system, wherein the user process defines an address space in the user-space memory for a helper process; and
    upon validating the plurality of parameters, protecting, by the computer system, the plurality of parameters from being accessed by another process in the user-space, wherein protecting the plurality of parameters from being accessed by another process in the user-space comprises:
        creating a separate helper process for the another process in the user-space,
        assigning a first identifier to the another process in the user-space and a second identifier to the separate helper process, wherein the second identifier is associated with the first identifier, and
        allowing only the system call wrapper to directly manipulate the separate helper process.

2. The method of claim 1, wherein protecting the plurality of parameters from being accessed by another process in the user-space after the plurality of parameters have been validated by the system call wrapper comprises:
    translating, by the computer system, the system call from the user process to the helper process of the system call wrapper; and
    storing the plurality of parameters of the system call within the address space of the helper process in the user-space memory.

3. The method of claim 1, wherein protecting the plurality of parameters from being accessed by another process in the user-space after the plurality of parameters have been validated by the system call wrapper comprises:
    creating, by the computer system, the helper process, separate from the system call wrapper, having the address space in the user-space memory to store the plurality of parameters; and
    making, by the computer system, the address space of the helper process unreadable and unwritable by the user process, except for an area of the address space that is explicitly shared between the helper process and at least one other process in the user-space.

4. The method of claim 1, further comprising:
    forwarding, by the computer system, the system call to the kernel from the helper process separate from the user process, wherein the address space of the helper process in the user-space memory stores the plurality of parameters of the system call.

5. The method of claim 1, wherein the first identifier is an odd number and the second identifier is an even number.

6. The method of claim 1, wherein the system call wrapper is a kernel module within the kernel in the computer system.

7. The method of claim 1, wherein the plurality of parameters comprise at least one of the following: a file name, a memory address location, a device identifier, a network address, a shared memory structure, a mutual exclusion structure, a process, or a thread.

8. An apparatus comprising:
    a memory hosting a kernel, a system call wrapper, and a protection mechanism, the memory comprising a kernel space and a user-space memory, wherein the user-space memory is located outside of the kernel space memory; and;
    a processor, coupled to the memory, to cause:
        the system call wrapper to validate a plurality of parameters of a system call directed to the kernel, the plurality of parameters supplied by a user process in a user-space, wherein the user process defines an address space in the user-space memory for a helper process, and to cause
        the protection mechanism to protect the plurality of parameters from being accessed by another process in the user-space after the system call wrapper has validated the plurality of parameters, wherein the user process defines an address space in the user-space memory for a helper process, wherein the protection mechanism comprises a process creator to create a separate helper process for the another process in the user-space, to assign a first identifier to the another process in the user-space and a second identifier to the separate helper process, and to allow only the system call wrapper to directly manipulate the separate helper process, wherein the second identifier is associated with the first identifier.

9. The apparatus of claim 8, wherein the protection mechanism comprises:
    a call translator to translate the system call from the user process to the helper process of the system call wrapper and to store the plurality of parameters of the system call within the address space of the helper process.

10. The apparatus of claim 8, wherein the protection mechanism comprises:
    a process creator to create the helper process, separate from the system call wrapper, having the address space to store the plurality of parameters, and to make the address space of the helper process unreadable and unwritable by the user process, except for an area of the address space that is explicitly shared between the helper process and at least one other process in the user-space.

11. The apparatus of claim 8, wherein the processor further causes the system call wrapper to forward the system call to the kernel from the helper process separate from the user process, wherein an address space of the helper process in the memory stores the plurality of parameters of the system call.

12. The apparatus of claim 8, wherein the first identifier is an odd number and the second identifier is an even number.

13. The apparatus of claim 8, wherein the system call wrapper is a kernel module within the kernel.

14. The apparatus of claim 8, wherein the plurality of parameters comprise at least one of the following: a file name, a memory address location, a device identifier, a network address, a shared memory structure, a mutual exclusion structure, a process, or a thread.

15. A non-transitory machine-readable storage medium embodying instructions that, when executed by a processor in a computer system, will cause the processor to perform a method comprising:
    validating, by a system call wrapper in the computer system, a plurality of parameters of a system call directed to a kernel, the plurality of parameters supplied by a user process in a user-space in a user-space memory located outside of a kernel space of the computer system, wherein the user process defines an address space for a helper process in the user-space memory; and upon validating the plurality of parameters, protecting, by the computer system, the plurality of parameters from being accessed by another process in the user-space, wherein protecting the plurality of parameters from being accessed by another process in the user-space comprises:

creating a separate helper process for the another process in the user-space, assigning a first identifier to the another process in the user-space and a second identifier to the separate helper process, wherein the second identifier is associated with the first identifier, and allowing only the system call wrapper to directly manipulate the separate helper process.

16. The non-transitory machine-readable storage medium of claim 15, wherein protecting the plurality of parameters from being accessed by another process in the user-space after the plurality of parameters have been validated by the system call wrapper comprises:

translating, by the computer system, the system call from the user process to the helper process of the system call wrapper; and storing the plurality of parameters of the system call within the address space of the helper process in the user-space memory.

17. The non-transitory machine-readable storage medium of claim 15, wherein protecting the plurality of parameters from being accessed by another process in the user-space after the plurality of parameters have been validated by the system call wrapper comprises:

creating, by the computer system the helper process, separate from the system call wrapper, having the address space in the memory to store the plurality of parameters; and making, by the computer system, the address space of the helper process unreadable and unwritable by the user process, except for an area of the address space that is explicitly shared between the helper process and at least one-other process in the user-space.

18. The non-transitory machine-readable storage medium of claim 15, wherein the method further comprises:

forwarding, by the computer system, the system call to the kernel from the helper process separate from the user process, wherein the address space of the helper process in the memory stores the plurality of parameters of the system call.

19. The non-transitory machine-readable storage medium of claim 15, wherein the first identifier is an odd number and the second identifier is an even number.

20. The non-transitory machine-readable storage medium of claim 15, wherein the system call wrapper is a kernel module within the kernel in the computer system.

21. The non-transitory machine-readable storage medium of claim 15, wherein the plurality of parameters comprise at least one of the following: a file name, a memory address location, a device identifier, a network address, a shared memory structure, a mutual exclusion structure, a process, or a thread.

* * * * *